United States Patent [19]

Meynier

[11] Patent Number: 5,801,642
[45] Date of Patent: Sep. 1, 1998

[54] DEVICE FOR EXPLORING AN UNDERGROUND FORMATION CROSSED BY A HORIZONTAL WELL COMPRISING SEVERAL SENSORS PERMANENTLY COUPLED WITH THE WALL

[75] Inventor: Patrick Meynier, Garennes, France

[73] Assignee: Institut Francais du Petrole, Rueil-Malmaison, France

[21] Appl. No.: 732,596

[22] Filed: Oct. 15, 1996

[30] Foreign Application Priority Data

Oct. 17, 1995 [FR] France ................... 95 12265

[51] Int. Cl.$^6$ ........................................... G01V 1/40
[52] U.S. Cl. .................. 340/856.1; 181/108; 181/112; 181/122; 73/152.17
[58] Field of Search ..................... 181/108, 104, 181/105, 112, 122; 340/856.1, 856.4; 73/152.17

[56] References Cited

U.S. PATENT DOCUMENTS

| Re. 32,070 | 1/1986  | Vezin          | 324/347   |
|------------|---------|----------------|-----------|
| 3,282,349  | 11/1966 | Cobbs et al.   | 166/241   |
| 3,991,850  | 11/1976 | Escaron        | 181/102   |
| 4,757,873  | 7/1988  | Linyaev et al. | 181/105   |
| 4,979,585  | 12/1990 | Chesnutt       | 181/102   |
| 5,022,484  | 6/1991  | Panetta et al. | 181/102   |
| 5,111,903  | 5/1992  | Meynier        | 181/102   |
| 5,146,050  | 9/1992  | Strozeski et al. | 181/102 |
| 5,212,354  | 5/1993  | Miller et al.  | 181/108   |
| 5,330,364  | 7/1994  | Mount, II et al. | 340/855.1 |
| 5,502,686  | 3/1996  | Dory et al.    | 367/34    |

FOREIGN PATENT DOCUMENTS

| 2547861 | 12/1984 | France . |
| 2636741 | 3/1990  | France . |
| 2656034 | 6/1991  | France . |
| 2674029 | 9/1992  | France . |
| 2249333 | 5/1992  | United Kingdom . |

*Primary Examiner*—J. Woodrow Eldred
*Attorney, Agent, or Firm*—Antonelli, Terry, Stout & Kraus, LLP

[57] ABSTRACT

The invention relates to a device for exploring an underground formation crossed by a well, suited to work in well portions where the advance thereof under the effect of gravity is difficult, notably in horizontal well portions or in well portions greatly inclined to the vertical. A plurality of rigid exploration modules (Mi) are interconnected end to end, each one including a rigid pipe (1), a flexible leaf (11) fastened to each pipe (1) so as to press against the wall of the well at least one box (18) containing sensitive elements, a linking cable (32) connected to a surface central station (40), and a connecting block (26) comprising an acquisition system (37) connected to the various modules (M1-Mn) by a bundle of electric conductors running through the tubular elements (1), and a deferred electric connection useful in damp conditions between linking cable (32) and the acquisition system. The connecting block is interposed between the array of exploration modules (M1-Mn) and a rigid string (39) connected to the surface operating device (38) for driving the exploration assembly into the well portion. The invention may be used for seismic prospecting for example.

19 Claims, 3 Drawing Sheets

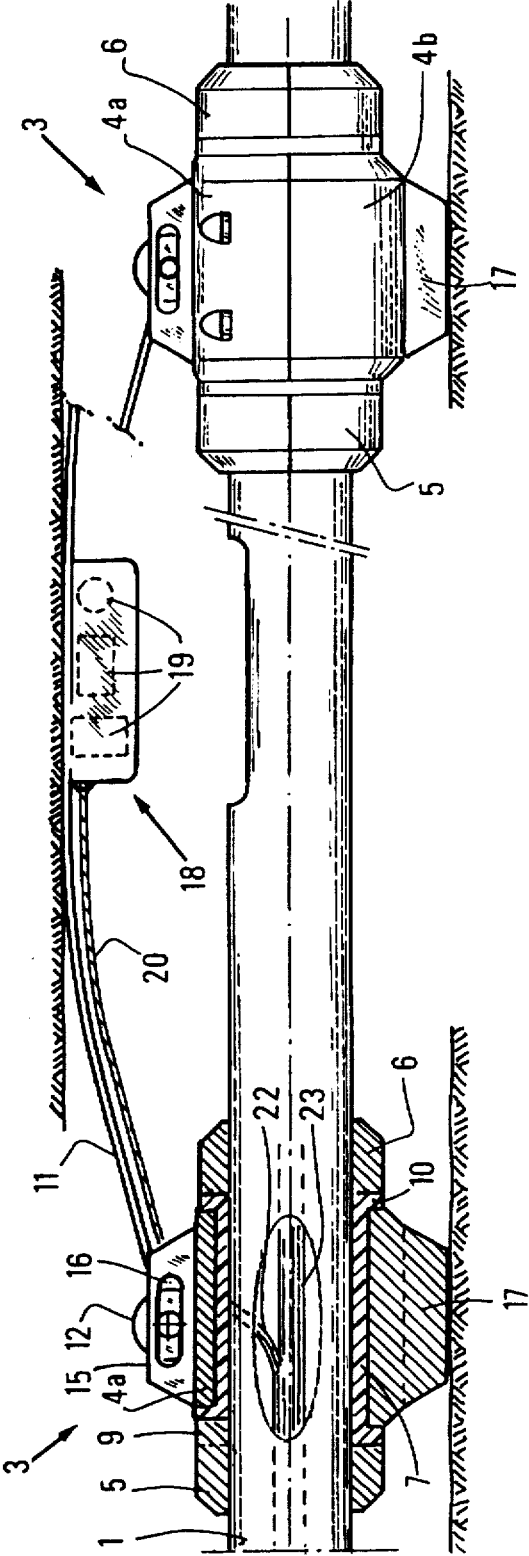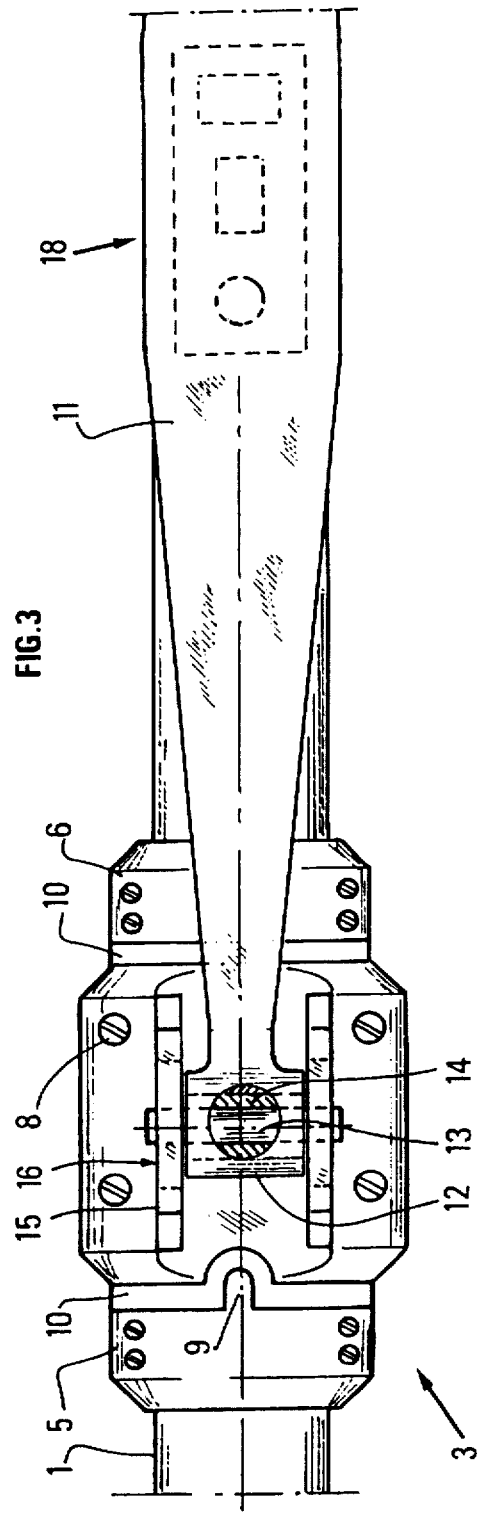

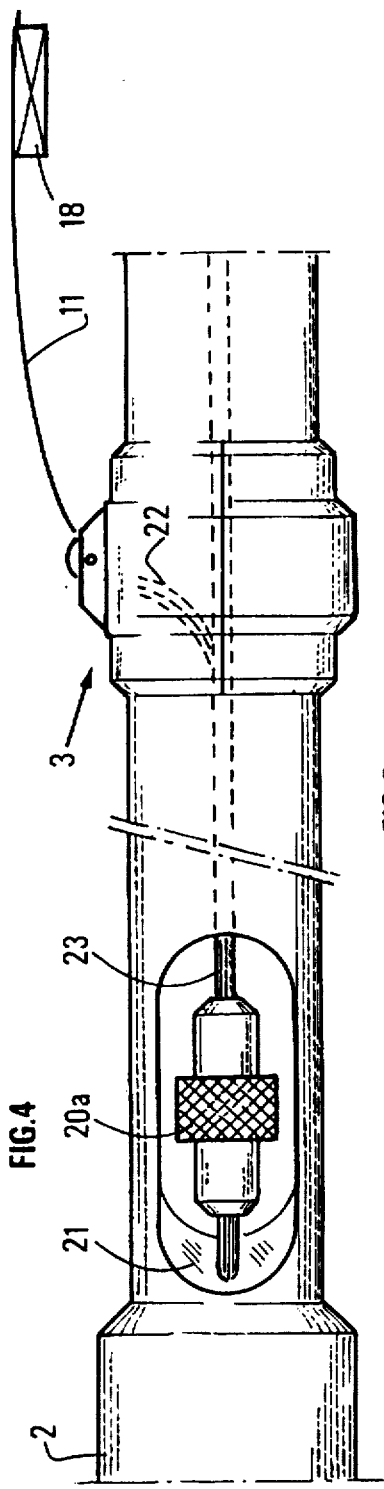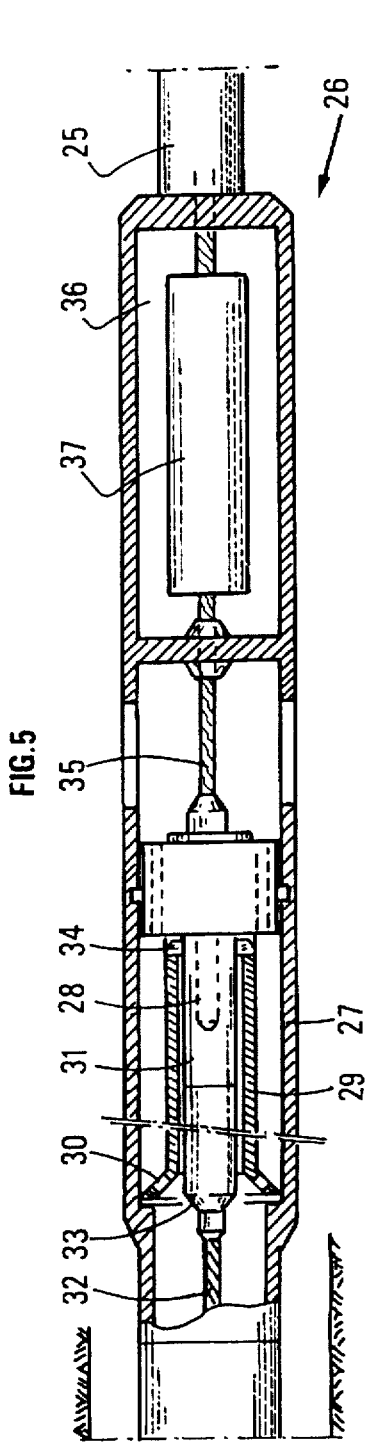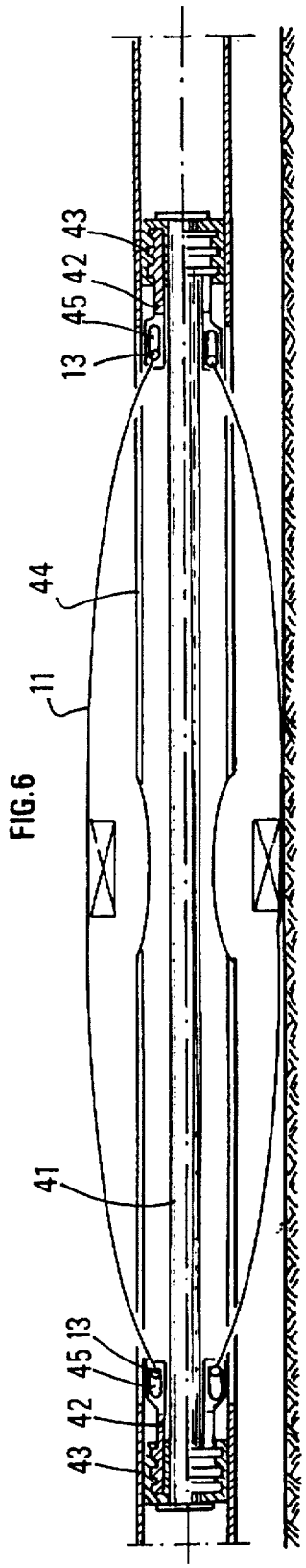

DEVICE FOR EXPLORING AN UNDERGROUND FORMATION CROSSED BY A HORIZONTAL WELL COMPRISING SEVERAL SENSORS PERMANENTLY COUPLED WITH THE WALL

BACKGROUND OF THE INVENTION

1. Field of the Invention

The present invention relates to a device for exploring an underground formation crossed by a well, suited to work in well portions where the advance thereof under the effect of gravity is difficult, notably in horizontal well portions or well portions greatly inclined to the vertical.

2. Description of the Prior Art

According to a well-known technique, seismic exploration of a geologic formation is performed by placing a receiving and/or transmitting set in one or more wells drilled through the formation in order to pick up signals reflected by subsoil discontinuities in response to seismic or acoustic waves emitted in a well or at the ground surface.

Seismic equipments can be used in vertical portions or in sufficiently vertical portions of the wells and, in this case, they are lowered therein through the effect of gravity.

Seismic equipments are for example placed in a well tool or in several well tools arranged in series along an electrical cable, as described for example in the assignee's Patents: French Patent 2,501,380 and corresponding U.S. Pat. No. 4,428,422, French Patent 2,616,230 and corresponding U.S. Pat. No. 4,901,289, French Patent 2,636,741 and corresponding U.S. Ser. No. 410,417.

The assignee's patents French Patent 2,656,034 and corresponding U.S. Pat. No. 5,181,565 and French Patent 2,674,029 and corresponding U.S. Pat. No. 5,243,562 describe a method of seismic prospecting of a geologic formation comprising using a reception device including one or more reception units that are set in a vertical well by means of a production string. The units are driven to the setting depth thereof and pressed against the wall of the well or against a casing pipe. Coupling can be achieved by means of shoes or arms that can be driven away from the string under the action of springs. These units can also be placed in boxes that are driven away from the string and mechanically decoupled therefrom.

The assignee's French Patent 2,703,470 and U.S. Ser. No. 219,268 describe a process for setting, in one or more wells crossing an underground zone, a seismic or acoustic wave transmission-reception device comprising for example transmitting-receiving transducers that can be placed behind a tubular string used for other purposes and connected, permanently or not, to a surface control and recording station by means of cables. Such an assembly allows for example to perform P-wave or S-wave loggings of the layers surrounding each well and therefore a long-lasting monitoring of a reservoir.

The assignee's French Patent 2,655,373 and corresponding U.S. Pat. No. 5,111,880 describe a system for driving a non rigid exploration device including several sondes connected together by electrical cable portions into a well where the advance thereof under the effect of gravity is hindered notably because of the inclination of the well to the vertical. This device is guided towards a deflected well zone by means of a tubular string of pipes. A deferred electrical connection device is used to connect the array of sondes to a cable connected to a surface control and recording station. A fluid current is established in the string in order to push the first sonde out of the string and to allow opening of the anchor arm. A traction exerted on the string allows the array of sondes to be taken out of the well and measurement cycles are conducted.

SUMMARY OF THE INVENTION

The invention is notably suited for subsurface seismic prospecting operations.

The device according to the invention allows exploration of an underground formation crossed by a well and it is suited to be lowered into a well zone where the advance thereof under the effect of gravity is difficult, notably in a well portion greatly inclined to the vertical. The invention comprises:

a plurality of rigid exploration modules interconnected end to end, each one comprising a rigid tubular element provided, at each end thereof, with a connection with at least one other tubular element, at least one box containing sensitive elements, a spring spacer for pressing each box permanently against the wall of the well, and decoupling device for isolating mechanically each box from the tubular elements, a linking cable connected to a surface central station; and a connecting block comprising an acquisition system connected to the various modules by a bundle of electrical conductors running through the tubular elements, connected to the sensitive elements, for collecting signals coming from the various sensitive elements, a deferred electrical connection useful for wet conditions between the linking cable and the acquisition system, the connecting block being interposed between the exploration modules and a rigid string connected to surface operating device for driving the exploration assembly into the well portion.

According to an embodiment, the spring spacer comprises for example flexible leaves, each one resting at the ends thereof on sleeves secured to each tubular element, to which the boxes are fastened, and the decoupling device comprises sheaths made from a damping material, interposed between each flexible leaf and the corresponding tubular element.

Each sleeve includes for example a supporting element set between two end stops secured to the tubular element, and is mechanically isolated, by means of a sheath, from the supporting element and the stops. The device comprises electric connectors inside the rigid tubular elements for electric connection with the bundle of electric conductors associated with the sensitive elements.

Each supporting element can comprise, for example, two parts on either side of the tubular element, the sheath being interposed, and fastening means for joining the two parts and optionally an indexing device for preventing any rotation of the supporting elements with respect to the tubular element.

Each flexible leaf is preferably secured, at the ends thereof, to pins that can move in guide ports in plates secured to each supporting element.

According to another embodiment, the spring spacer comprises flexible leaves to which the boxes are fastened, each flexible leaf fitting into a slot provided in the wall of the pipe along a generating line and resting, at the opposite ends thereof, on sleeves secured to a rigid tube placed inside each tubular element, the decoupling device includes sheaths made from a damping material, interposed between each sleeve so as to insulate it acoustically from the inner wall of the tublar element and from the rigid tube, and each flexible leaf is secured, at the ends thereof, to pins that can move in guide ports provided in the sleeves.

According to another embodiment, the deferred electric connection includes a multi-contact plug, a tubular extension for guiding, in the connecting block, a multi-contact socket connected to the multi-conductor cable and a lock for locking the socket in an engaging position.

According to a particular embodiment, the device comprises a tubular head element including an unbalanced mass and an orientation indicator for determining the angular positioning of the whole of the exploration modules with respect to the vertical.

The device according to the invention is advantageous in that:

- it can be made by interconnecting end to end a variable number of standard exploration modules associated, by means of a connecting block, with a string of pipes that is of sufficient length to be pushed down into a well portion that is either very inclined or so shaped that it prevents free lowering of the array of modules,
- the electrical links between the various instruments or sensors are all joined and protected in the tubular elements.

BRIEF DESCRIPTION OF THE DRAWINGS

Other features and advantages of the device according to the invention will be clear from reading the description hereafter of embodiments given by way of non limitative examples, with reference to the accompanying drawings in which:

FIG. 3 shows in detail the layout of a connecting sleeve of a flexible leaf;

FIG. 4 diagrammatically shows the mode of connection, to a bundle of conductors running along the tubular elements, of the electrical conductors associated with the sensitive elements;

FIG. 5 diagrammatically shows a sectional view of a block connecting all of the exploration modules to a string of pipes extending up to the surface; and FIG. 6 shows a second embodiment comprising two flexible leaves associated with the tubular elements by means of fastening means placed inside these elements.

DESCRIPTION OF THE PREFERRED EMBODIMENTS

Figure 1:
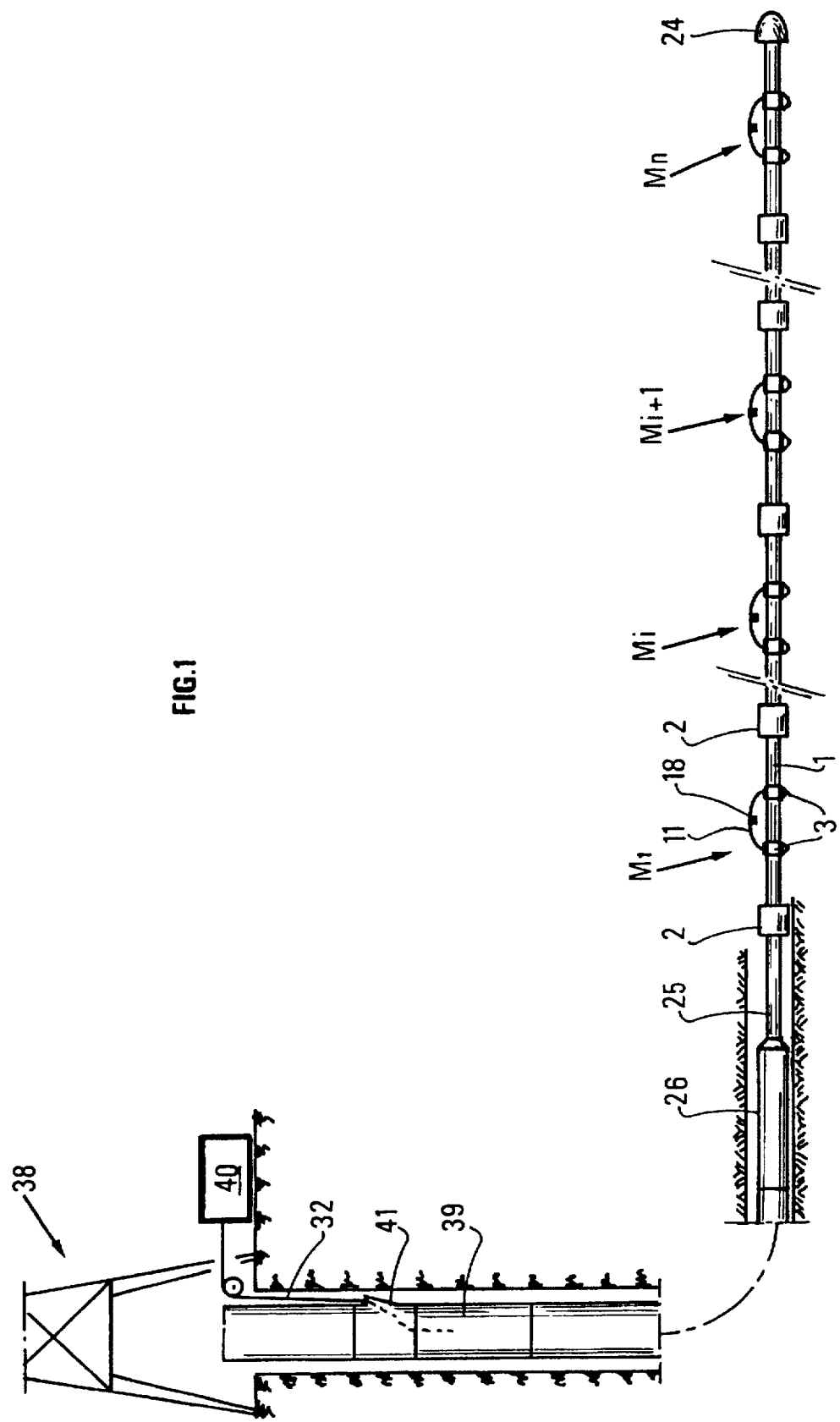
FIG. 1 diagrammatically shows a first embodiment of the invention, set in a well part of which is horizontal, FIG. 2 diagrammatically shows a sectional view of the layout of each exploration module.

The invention includes (FIGS. 1, 2) of an array of modules M1, Mi, Mi+1, . . . , Mn interconnected end to end. Each one of these modules Mi includes a rigid tubular element or pipe 1 having at the two opposite ends thereof a fastening piece 2 in order to be connected (by screwing on for example) to the ends of the adjacent tubular elements. Two sleeves 3 are arranged on each pipe 1 at a distance from one another. Each sleeve 3 comprises a supporting element 4 placed between two end stops 5 and 6 rigidly fastened to pipe 1. A sheath made from an elastic material 7 is placed around the tubular element between each pair of stops 5 and 6. Supporting elements 4 each comprise two half-shells 4a, 4b pressed against sheath 7 on either side of the tubular element and joined to each other by screws 8. In order to prevent rotation of supporting elements 4 around pipes 1, at least one of stops 5 and 6 comprises an indexing dowel 9 which fits into a corresponding cavity of one of the half-shells, 4a for example. The decoupling sheaths 7 comprise end plates 10 for isolating mechanically supporting elements 4 from the respective stops thereof 5, 6.

The device also comprises a flexible leaf 11 having at the opposite ends an end piece 12 provided with a cavity for a pin 13 (FIGS. 2, 3). A decoupling device 14 of the "silent block" type for example is arranged around each pin 13. One of the half-shells 4a of each supporting element 4 comprises two lateral plates 15 oriented parallel to the axis of the pipes and provided with elongate openings 16 for guiding the pin 13 of each end piece. Sliding of each pin 13 provides each flexible leaf 11 with a certain bending latitude. The opposite half-shell 4b of each supporting element 4 comprises a bearing shoe 17.

A box 18 intended for exploration instruments is fastened to the median part of each flexible leaf 11 (FIG. 2). These instruments may be sensors notably sensitive to acoustic or seismic waves such as a triaxial geophone or "triphone" 19 for example. The electrical conductors 20 associated with these instruments run out of boxes 18 through sealed ducts (not shown) and run along flexible leaf 11. They enter pipe 1 through an opening (not shown) at the level of one of the supporting elements 4.

A multi-pin connector 20a (FIG. 4) is placed inside each pipe 1. It is accessible by removing a detachable plate 21 covering an opening through the wall. Electrical conductors 22 associated with the instruments in the box 18 of the same module Mi on the one hand, and conductors 23 associated with other instruments in the next modules Mi+1. . . Mn on the other are welded to the pins of connector 20.

The whole of the modules, interconnected end to end, have a tubular head element 24 at a first end provided with an unbalanced mass and with an orientation indicator (not shown) intended to determine the orientation of the unbalanced mass with respect to the vertical plane. An indicator of a well-known type comprising a pendular weight in contact with a potentiometer track can for example be used.

At the opposite end thereof, tubular element M1 is connected by a pipe 25 to a connecting block 26 provided with a deferred electrical connection useful in wet conditions. Block 26 comprises (FIG. 5) a tubular body 27, a multi-contact plug 28 oriented along the axis of body 27, in the center of a tubular guide extension 29 whose section is smaller than that of the body and ends at a flange 30. This extension 29 serves to guide a multi-contact socket 31 that is connected to the various conductors of a multi-conductor cable 32 which fits onto plug 28. Socket 31 have a tubular weighting bar 33. Locks 34, which can be remote-controlled from the surface, allow the socket to be locked in a position of plugging onto plug 28.

A cable 35 connects multi-contact plug 28 to a sealed compartment 36 of the tubular body 27 containing an acquisition and transmission system 37 as described for example in the assignee's French Patent 2,688,896. Connecting block 26 is connected to surface operating device 38 by means of a string of pipes 39.

System 37 receives the signals transmitted thereto through a bundle formed by adding successively, at the level of connectors 21, the conductors coming respectively from the various boxes 18 associated with the array of modules M1 to Mn and with the orientation indicator in the tubular head element 24. System 37 digitizes received signals and codes them in order to be transmitted to a surface central control and recording station 40.

In order to simplify the set up of exploration modules M1–Mn, they can be standardized by placing preferably in each one of them identical multi-pin connectors 21 with a sufficient number of pins in order to allow interconnection of all the conducting lines that finally end at acquisition and coding assembly 37.

According to a layout described in the assignee's French Patent 2,547,861, connection between the multi-conductor cable 32 and the central station 40 is facilitated by using a special side-entry sub 41 allowing, once it is in place, changing of the length of the string of pipes 39 without it being necessary to interrupt the conducting links.

An exploration assembly comprising 12 tubular elements 1 having a length of multiples of ten meters, made of steel, aluminium or glass fiber, associated each with a "triphone", and containing for example an electric connector 20 with 61 pins also allowing electric connection of the orientation indicator in head section 24, can for example be set up.

Operation

Setting the array of exploration modules M1 to Mn in a zone of a well where operations are planned is performed as follows:

The tubular head element 24 is introduced into the well, as well as, by successive interconnections end to end, the various modules M1 to Mn, the pipe 25, the connecting block 26 and possibly a certain number of sections of the string of pipes 39. The special side-entry sub 41, in which the multi-contact socket 31 having weighting bar 33, is inserted, is fastened thereafter. A swivel (not shown) is thereafter associated with the string of pipes 39 in order to pump multi-contact socket 31 until it fits onto the plug 28 of connecting block 26.

A sufficient number of sections is then added to the string of pipes 39 so as to drive the array of exploration modules M1–Mn into the zone of the well where exploration operations are to be performed. By monitoring, from surface station 40, the indications of the orientation detector in the head element 24 provided with a weighting mass and by rotating sufficiently the string of pipes 39 during the advance thereof, the various modules M1 to Mn can be so oriented that the flexible leaves 11 and thus the instrument boxes 18 are all in the same plane, the vertical plane for example.

A seismic source can for example be placed on the surface or in another well, seismic pick-ups are placed in the boxes 18 of the various modules M, and transmission-reception cycles can be carried out while the signals collected by acquisition set 26 and transmitted through cable 32 are recorded at the surface station 40.

The whole of the modules can be shifted at will by adding (or by removing) additional sections to the string of pipes 39 so as to explore the formation over a greater well length and to perform multiple coverages.

In the first embodiment described above, each exploration module comprises a single flexible leaf 11 for pressing an instrument box against the wall of the well, and a diametrically opposite bearing shoe 17. However, exploration modules M1–Mn possibly including several flexible leaves optionally bearing other instrument boxes 18 can of course be used.

This is notably the case with the embodiment of FIG. 6 having two flexible leaves 11 each equipped with a box for exploration elements such as geophones for example. The device comprises a rigid tube 41 whose diameter is smaller than that of each tubular element 1 and that is placed inside the latter. It is held in position, in relation to the tubular element, by two sleeves 42. An elastic sheath 43 is placed around each sleeve 42 so as to decouple it acoustically from both tube 41 and the inner wall of tubular element 1. The flexible leaves 11 are partly fitted into grooves 44 provided along two opposite generating lines of each tubular element 1. The pins 13, at the opposite ends thereof, can slide in the guide ports 45 provided in end pieces 42. With this fastening mode, each tubular element offers protection to the connecting sleeves of the flexible leaves when the device progresses along the well.

An additional section comprising a source of acoustic or seismic waves can also be associated with the array of exploration modules M1–Mn, or transmitting-receiving transducers can be placed in boxes 18 without departing from the scope of the invention.

The following modifications may also be provided without departing from the scope of the invention:

- the flexible leaves allowing coupling of the instrument boxes with the wall of the well may be replaced by other coupling means such as shoes connected to arms opened by action of spacing devices;
- the single acquisition system 37 may be replaced by electronic acquisition modules distributed in various tubular elements 1 and communicating the signals acquired to a coding and transmission assembly in connecting block 26;
- the rigid tubular elements may be replaced by semi-rigid multi-conductor cable elements with an external glass fiber sheath;
- the separate mechanical and electric connectors 2 and 20A of FIG. 4 may be replaced by a combined embodiment where the mechanical connection of the tubular elements leads to the fitting of the electrical connectors, as described for example in the assignee's patent EP-290, 338;
- tubular elements 1 are provided, according to a known technique, with slots intended to reduce the propagation velocity of the waves along the string may be used.

I claim:

1. An exploration device to be driven in a well through an underground formation to a portion deviating from a vertical orientation thereof by securing the device to an end of a pipe string made by interconnection end to end of pipe sections, the device including:

- a plurality of rigid exploration modules interconnected end to end, being disposed at least partially in the portion and each having a rigid tubular element provided, at each end thereof, with a connection for connection with at least one other tubular element, at least one box, at least one sensor housed in the box, a spring spacing device for pressing each box against a wall of the well, and a decoupler for mechanically isolating each box from the tubular elements;
- a first multi-conductor cable connected to a surface central station; and
- a connecting block including an acquisition and transmission electronic system for acquisition of signals sensed by the different sensors and transmission thereof to the central station, a second multi-conductor cable running through each tubular element, for connecting each sensor in each box to the connecting block and a connector for making connections in a wet environment and connecting the first multiconductor cable with the connecting block when the exploration modules are lowered in the well.

2. An exploration device to be driven in a well through an underground formation to a portion deviating from a vertical orientation by securing the device to an end of a pipe string made interconnection end to end of pipe sections, the device including:

- a plurality of rigid exploration modules interconnected end to end, each having a rigid tubular element provided at each end thereof, with a connection for connection with at least one other tubular element, a sleeve secured to each tubular element, at least one box, at least one sensor housed in the box, a flexible leaf for pressing each box against a wall of the well, each of the leaves resting at the end thereof on the sleeves, and a decoupler for mechanically isolating each box from the tubular elements, the decoupler including a sheath made from a damping material interposed between each flexible leaf and one tubular element;
- a first multi-conductor cable connected to a surface central station;
- a connecting block including an acquisition and transmission electronic system for acquisition of signals sensed by the different sensors and transmission thereof to the central station, a second multi-conductor cable running through the tubular elements, for connecting each sensor in each box, to the connecting block and a connector for making connections in a wet environment connecting the first multiconductor cable with the connecting block when the exploration modules are lowered in the well.

3. A device as claimed in claim 2, wherein each sleeve comprises a supporting element placed between two end stops secured to one tubular element and mechanically isolated by the sheath from the supporting element and the two end stops and further comprising electrical connectors inside the rigid tubular elements for electrical connection to the second multi-conductor cable.

4. A device as claimed in claim 3, wherein each supporting element comprises two parts disposed on either side of a tubular element with the sheath being interposed between the two parts and one of the tubular elements and further including a fastener for joining the two parts.

5. A device as claimed in claim 3 further comprising an indexer for preventing rotation of each supporting element with respect to each tubular element.

6. A device as claimed in claim 4 further comprising an indexer for preventing rotation of each supporting element with respect to each tubular element.

7. A device as claimed in claim 2, wherein each flexible leaf is secured, at ends thereof, to pins movable in guide ports provided in plates secured to each supporting element.

8. A device as claimed in claim 3, wherein each flexible leaf is secured, at ends thereof, to pins movable in guide ports provided in plates secured to each supporting element.

9. A device as claimed in claim 4, wherein each flexible leaf is secured, at ends thereof, to pins movable in guide ports provided in plates secured to each supporting element.

10. A device as claimed in claim 5, wherein each flexible leaf is secured, at ends thereof, to pins movable in guide ports provided in plates secured to each supporting element.

11. A device as claimed in claim 1 further including a rigid tube arranged inside each tubular element, a flexible leaf for pressing each box against a wall of the well and sleeves secured to the decoupler, each sleeve being provided with guide ports, wherein a wall of each tubular element is provided with slots and each one of the flexible leaves fits into one slot and rests at opposite ends, the sleeves each including a sheath made from a damping material, interposed between each sleeve and the tubular element for acoustically decoupling an inner wall of the tubular element and the rigid tube, and each flexible leaf is secured, at the ends thereof, to pins movable guide ports.

12. A device as claimed in claim 2 further including a rigid tube arranged inside each tubular element, a flexible leaf for pressing each box against a wall of the well and sleeves secured to the decoupler, each sleeve being provided with guide ports, wherein a wall of each tubular element is provided with slots and each one of the flexible leaves fits into one slot and rests at opposite ends, the sleeves each including a sheath made from a damping material, interposed between each sleeve and the tubular element for acoustically decoupling an inner wall of the tubular element and the rigid tube, and each flexible leaf is secured, at the ends thereof, to pins movable guide ports.

13. A device as claimed in claim 1, wherein the wet comprises a multi-contact plug, a tubular extension for guiding a multi-contact socket connected to the second multi-conductor cable in the connecting block and a lock for locking the socket in an engaged position.

14. A device as claimed in claim 2, wherein the wet comprises a multi-contact plug, a tubular extension for guiding a multi-contact socket connected to the second multi-conductor cable in the connecting block and a lock for locking the socket in an engaged position.

15. A device as claimed in claim 1, further comprising a tubular head element including an unbalanced weight and an orientation indicator for determining an angular position of the plurality of exploration modules with respect to a vertical orientation.

16. A device as claimed in claim 2, further comprising a tubular head element including an unbalanced weight and an orientation indicator for determining an angular position of the plurality of exploration modules with respect to a vertical orientation.

17. A device as claimed in claim 1, wherein the pipe string comprises a side-entry sub allowing passage of the first multi-conductor cable.

18. A device as claimed in claim 2, wherein the pipe string comprises a side-entry sub allowing passage of the first multi-conductor cable.

19. A device in accordance with claim 1, wherein the spring spacing device is an elongated member which deforms elastically.

* * * * *